United States Patent
Craven

[15] 3,674,749
[45] July 4, 1972

[54] POLYIMINOQUINAZOLINEDIONES
[72] Inventor: James M. Craven, Wilmington, Del.
[73] Assignee: E. I. du Pont de Nemours and Company, Wilmington, Del.
[22] Filed: Aug. 26, 1970
[21] Appl. No.: 71,285

[52] U.S. Cl.....................260/77.5 CH, 156/331, 252/182, 260/47 CB, 260/77.5 R
[51] Int. Cl........................................................C08g 22/04
[58] Field of Search ...............260/77.5 CH, 77.5 R; 252/182

[56] References Cited

UNITED STATES PATENTS

| | | | |
|---|---|---|---|
| 3,345,334 | 10/1967 | Angelo | 260/47 |
| 3,547,897 | 12/1970 | Patton | 260/77.5 |

*Primary Examiner*—Donald E. Czaja
*Assistant Examiner*—M. J. Welsh
*Attorney*—John E. Griffiths

[57] ABSTRACT

A novel polyiminoquinazolinedione composition which is the reaction product of a multifunctional isocyanate and a multifunctional o-aminonitrile.

9 Claims, No Drawings

POLYIMINOQUINAZOLINEDIONES

BACKGROUND OF THE INVENTION

There are a number of compositions known to the art which are useful as adhesives or laminates. However, many of these compositions are not thermally stable at high temperatures. Other such compositions tend to produce volatile by-products during a high temperature thermal cure. These volatile by-products tend to cause gas bubbles thereby weakening any structure of which they are a part.

SUMMARY OF THE INVENTION

This invention relates to a novel polyiminoquinazolinedione composition formed by thermally reacting a multifunctional isocyanate and a multifunctional aromatic o-aminonitrile. Substantially no volatile by-products are given off during the thermal reaction to a polyiminoquinazolinedione which would weaken the composition.

DESCRIPTION OF THE INVENTION

The polyiminoquinazolinedione of this invention is formed by thermally reacting a multifunctional isocyanate and a multifunctional aromatic o-aminonitrile.

Multifunctional aromatic o-aminonitriles which are suitable for use in this invention have the general structure $$(NC)_n-R-(NH_2)_n$$

where each CN is ortho or peri to an $NH_2$ group, where R can be

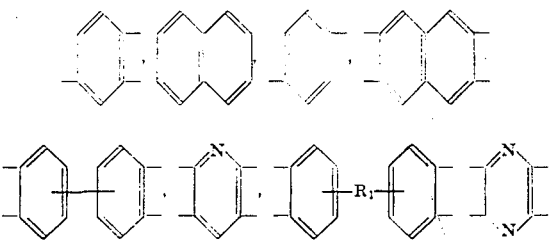

wherein $R_1$ (sometimes designated as $R^1$) can be an alkylene radical containing 1-4 carbon atoms,

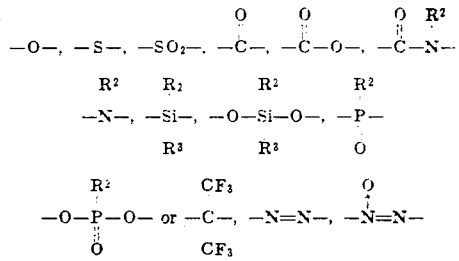

where $R^2$ and $R^3$ (sometimes designated as $R_2$ and $R_3$ respectively) are individually selected from the group consisting of an alkyl radical having one to three carbon atoms and an aryl radical, and where n is any integer greater than 1. Other functional groups may be attached to R so long as their reaction speed with an isocyanate group is less than that of the o-aminonitrile groups.

Preferred multifunctional aromatic or heterocyclic o-aminonitriles are difunctional aromatic o-aminonitriles, especially

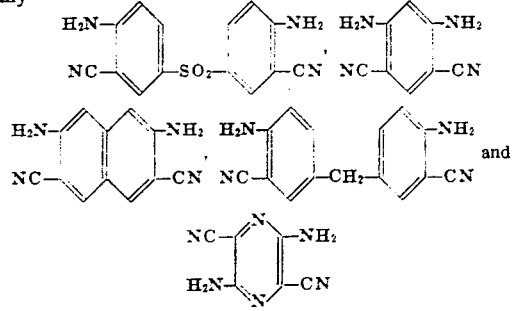

and

Multifunctional isocyanates suitable for use in the invention are any aromatic, aliphatic, alicyclic or heterocyclic isocyanates. The isocyanate selected must have at least 2 isocyanate functionalities.

The isocyanate should have the general structure $$R^4-(NCO)_n$$

wherein n is an integer than 1
and
where $R^4$ sometimes designated as $R_6$ can be an alkylene radical having two to 40 carbon atoms,

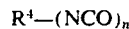

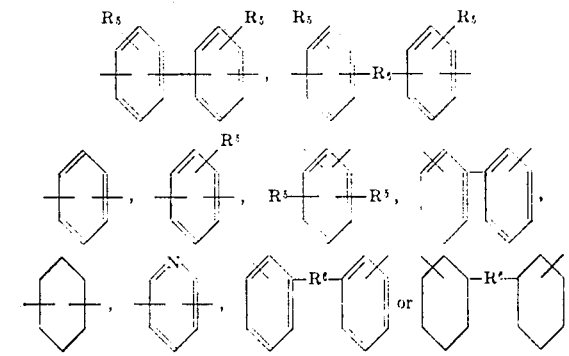

wherein $R^6$ sometimes designated as $R_6$ is either an alkylene radical containing one to four carbon atoms,

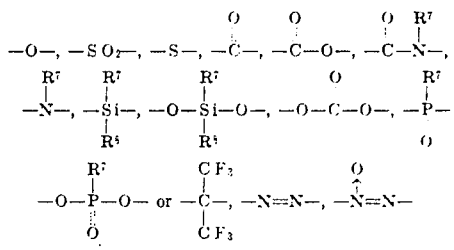

and $R^5$ sometimes designated as $R_5$ is an alkyl radical of one to three carbon atoms and $R^7$ and $R^8$ (sometimes designated as $R_7$ and $R_8$ respectively) are individually selected from the group consisting of an alkyl radical having one to three carbon atoms and an aryl radical.

The following are organic diisocyanates useful in this invention:

propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate,
2,11-diisocyano-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanates, such as methylpropyl-benzene diisocyanate, methylethylbenzene diisocyanate, and the like;
2,2'-biphenylene diisocyanate,
3,3'-biphenylene diisocyanate,
4,4'-biphenylene diisocyanate,
3,3'-dimethyl-4,4'-biphenylene diisocyanate, and the like;
methylene-bis-4-phenyl isocyanate),
ehtylene-bis-(4-phenyl isocyanate)
isopropylidene-bis-(4-phenyl isocyanate),
butylene-bis-(4-phenylisocyanate), hexafluoroisopropylidene-bis-(4-phenyl isocyanate), and the like;
2,2'-oxydiphenyl diisocyanate,
3,3'-oxydiphenyl diisocyanate,
4,4'-oxydiphenyl diisocyanate, and the like;
2,2'-ketodiphenyl diisocyanate, 3,3'-ketodiphenyl diisocyanate, 4,4'-ketodiphenyl diisocyanate,
2,2'-thiodiphenyl diisocyanate,
3,3'-thiodiphenyl diisocyanate,
4,4'-thiodiphenyl diisocyanate, and the like;
2,2'-sulfonediphenyl diisocyanate,
3,3'-sulfonediphenyl diisocyanate,
4,4'-sulfonediphenyl diisocyanate, and the like;
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyano-cyclohexyl)sulfide,
bis-(para-isocyano-cyclohexyl)sulfone,
bis-(para-isocyano-cyclohexyl)ether,
bis-(para-isocyano-cyclohexyl)diethyl silane,
bis-(para-isocyano-cyclohexyl)diphenyl silane,
bis-(para-isocyano-cyclohexyl)ethyl phosphine oxide,
bis-(para-isocyano-cyclohexyl)phenyl phosphine oxide,
bis-(para-isocyano-cyclohexyl)N-phenyl amine,
bis-(para-isocyano-cyclohexyl)N-methyl amine,
2,6-diisocyano-pyridine,
bis-(4-isocyano-phenyl)diethyl silane,
bis-(4-isocyano-phenyl)diphenyl silane,
dichloro-biphenylene diisocyanate,
bis-(4-isocyano-phenyl)ethyl phosphine oxide,
bis-(4-isocyano-phenyl)phenyl phosphine oxide
bis-(4-isocyano-phenyl)-N-phenyl amine,
bis-(4-isocyano-phenyl)-N-methyl amine,
3,3'-dimethyl-4,4'-diisocyano biphenyl,
3,3'-dimethoxy-biphenylene diisocyanate,
2,4-bis-(β-isocyano-t-butyl)toluene,
bis,-(para-β-isocyano-t-butyl-phenyl)ether,
para-bis-(2-methyl-4-isocyano-phenyl)benzene,
para-bis-(1,1-dimethyl-5-amino-pentyl)benzene,
3,3'-diisocyano adamantane,
3,3'-diisocyano biadamantane,
3,3'-diisocyanoethyl-1,1'-biadamantane,
1,2-bis-(3-isocyano-propoxy)ethane,
2,2-dimethyl propylene diisocyanate,
3-methoxy-hexamethylene diisocyanate,
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,

OCN(CH₂)₃ O(CH₂)₂ O(CH₂)₃ NCO,

OCN(CH₂)₃ S(CH₂)₃ NCO and

OCN(CH₂)₃ N(CH₂)₃ NCO, Preferred isocyanates are toluene-2,4-diisocyanate and 4,4'-methylenebis(phenylisocyanate).

The reaction of the multifunctional isocyanate and the multifunctional aromatic o-aminonitrile is a thermal cure of 130° to 300° C. for about 1 to 24 hours.

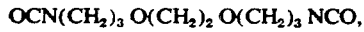

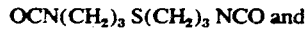

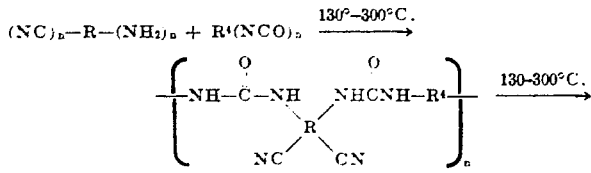

polyurea intermediate

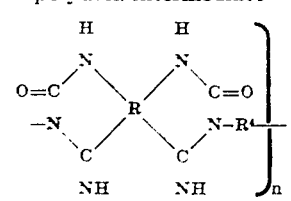

polyiminoquinazolinedione where n is an integer sufficient to give the polymer a molecular weight (number average) of greater than 2,000 where R can be

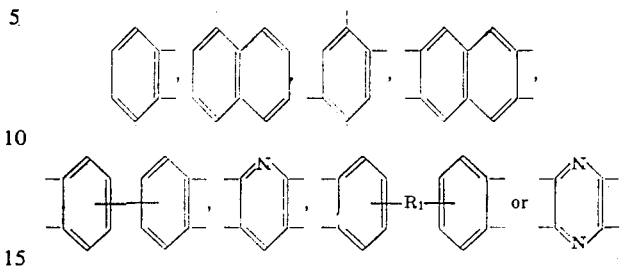

wherein R¹ can be an alkylene radical containing one to four carbon atoms,

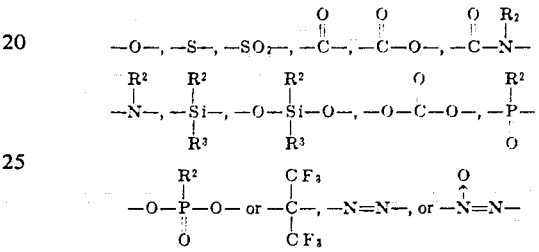

where R² and R³ are individually selected from the group consisting of an alkyl radical having one to three carbon atoms and an aryl radical, and where R⁴ can be an alkylene radical having two–12 carbon atoms

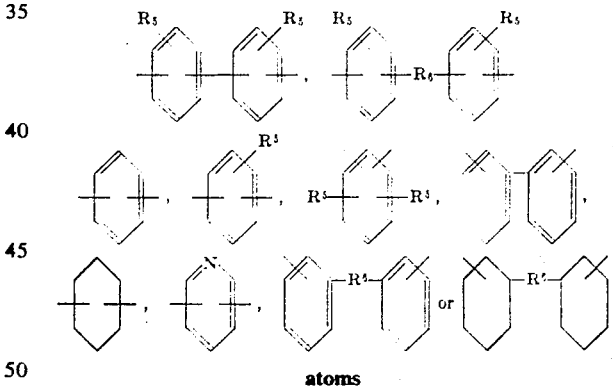

atoms wherein R⁶ is either an alkylene radical containing one to four carbon atoms,

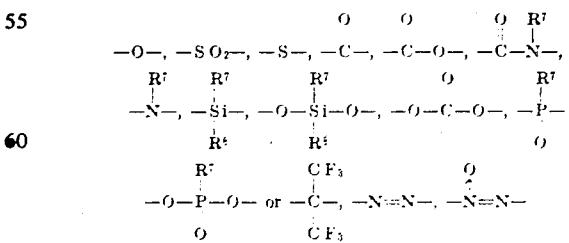

wherein R⁵ is an alkyl radical of one to three carbon atoms and R⁷ and R⁸ are individually selected from the group consisting of an alkyl radical having one to three carbon atoms and an aryl radical.

If the value of n is 2 for the multifunctional isocyanate and multifunctional o-aminonitrile, then preferably equimolar amounts of the isocyanate and o-aminonitrile should be used although up to a 10 percent excess by molar weight of either reactant can be tolerated in some cases without detracting too much from the properties of the polyiminoquinazolinedione. When n is greater than 2 for either of the reactants, then exact stoichiometry is not as critical and a 20-30 percent excess of either reagent can often be tolerated. However, for best properties of the polyiminoquinazolinedione it is usually best to use sufficient o-aminonitrile and isocyanate so that there are equivalent amounts of —NCO and —NHCH$_2$CN groups. For example if n=3 for the multifunctional isocyanate and n=2 for the multifunctional o-aminonitrile, then the molar ratio of multifunctional isocyanate to multifunctional o-aminonitrile should be about 2:3.

If the reactants are liquids, they can simply be mixed in the correct ratio, poured into a mold or other container and then heated to produce a polyiminoquinazolinedione object. If one is a liquid and the other a solid it is often possible to produce a solution of one in the other and treat as before. If the solid is insoluble in the liquid, it can often be milled or ground into the liquid to make a dispersion or paste, which can then be heated to prepare the polyiminoquinazolinedione. If both reactants are solids, they can be ground together to give a finely powdered mixture and then compression molded at a temperature high enough to melt the mixture and convert it to the polyiminoquinazolinedione.

Another technique that is often convenient when one or both of the reactants are solids is to use a solvent. The multifunctional isocyanate and multifunctional o-aminonitrile are dissolved in a solvent and the solution mixed. The resulting solution can then be applied to glass fabric, graphite fabric, polyamide fabric or any surface and the solvent evaporated. Any tendency for either the isocyanate or the o-aminonitrile to be deposited as a crystalline solid (which sometimes happens if one component has a high melting point) can be avoided by first heating the solution for a few minutes at the boiling point to get partial conversion to the polyurea, which effectively inhibits any crystallization of the reactants. However, it is often undesirable to heat the solution too long or to too high a temperature since too much conversion to polymer or premature conversion to polyiminoquinazolinedione can make the composition infusible. One useful embodiment of the invention is a fusible mixture of reactants that can be melted to allow molding, laminating or adhesive bonding and then further heated to convert it to a higher melting or infusible polyiminoquinazolinedione without producing any volatile by-products that would cause voids or bubbles. It is therefore desirable to remove solvent before converting the mixture to an infusible condition. Any solvent capable of dissolving the o-aminonitrile and isocyanate is useful so long as the solvent does not react with the isocyanate or the o-aminonitrile and so long as it can be evaporated at a temperature low enough to avoid conversion of the mixture to an infusible state. Typical solvents are toluene, xylene, methyl ethyl ketone, acetone, tetrahydrofuran, ethylene glycol dimethyl ether, chloroform and the like. After the solvent has been evaporated either at room temperature or in an oven at up to about 103°C., the composition can then be molded, laminated or used to make adhesive bonds at 100°-300°C., usually about 150°-200°C.

Copolymers can be made by reacting a mixture of multifunctional isocyanates with a mixture of multifunctional o-aminonitriles. Copolymers can also be made by incorporating a third multifunctional compound reactive with either the isocyanate or the o-amino-nitrile. Examples are diamines, diols, dithioles, isothiocyanates, etc.

Additives such as antioxidants, pigments, dyes, other polymers or resins, can also be added to achieve desired appearances or physical properties according to methods well known in the polymer art.

UTILITY

The polyiminoquinazolinediones of this invention have particular utility as high temperature adhesives, structural laminates, and circuit boards.

DESCRIPTION OF THE PREFERRED EMBODIMENTS

The following examples illustrate the various aspects of the invention in greater detail. However, it should be recognized that they are only illustrative. Variations from what is disclosed will undoubtedly occur to those skilled in the art, but will nevertheless be embraced by the inventive concept. All parts are by weight.

EXAMPLE 1

2,6-diamino-3,5-dicyanopyrazine (83 parts) and toluene-2,4-diisocyanate (90 parts) were mixed together to produce a paste. The paste was then pressed between two glass plates for 45 minutes at 193°-204°C. at about 200 psi which caused the two compounds to react and bond the glass plates together with a hard layer of adhesive substantially in the polyiminoquinazolinedione form.

EXAMPLE 2

A solution of 0.745 g. 5,5'-sulfonylbis(anthranilonitrile in 2 ml. tetrahydrofuran were mixed with 0.435 g. toluene-2,4-diisocyanate. The resulting solution was coated on glass plates and dried 5 hours at room temperature and 1 hour at 120° C. The plates were then pressed together for 1 hour at 177°C. at 80-370 psi. The glass plates became bonded together with a layer of adhesive substantially in the polyiminoquinazolinedione form.

The invention claimed is:

1. A polymer consisting essentially of the structure described by the formula

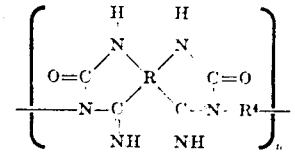

where $n$ is an integer sufficient to give the polymer a molecular weight (number average) of greater than 10,000 wherein R is selected from the group consisting of

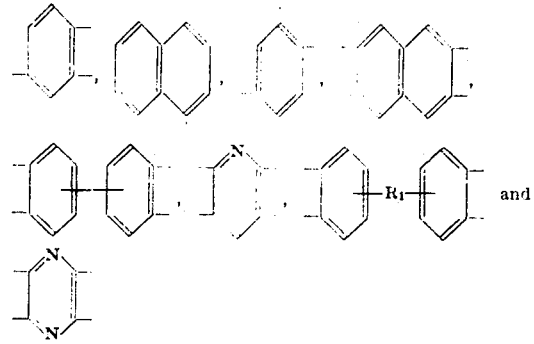

wherein $R^1$ can be an alkylene radical containing one to four carbon atoms,

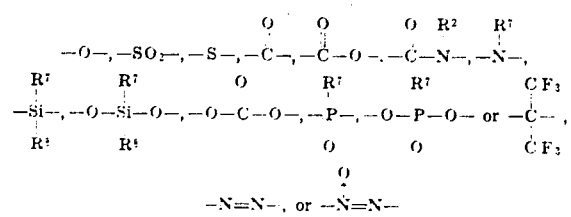

where $R^2$ and $R^3$ are individually selected from the group consisting of an alkyl radical having one to three carbon atoms and an aryl radical, and where $R^4$ can be an alkylene radical having 2-12 carbon atoms,

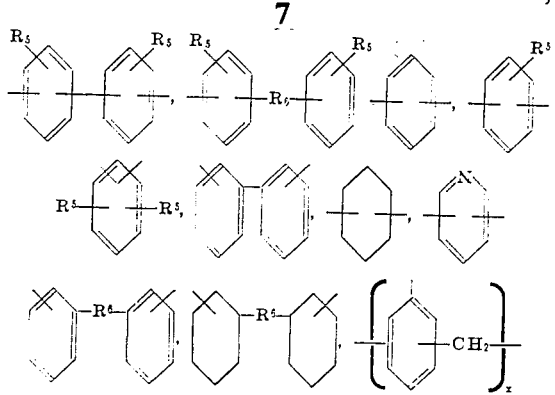

wherein $R^6$ is either an alkylene radical containing one to four carbon atoms,

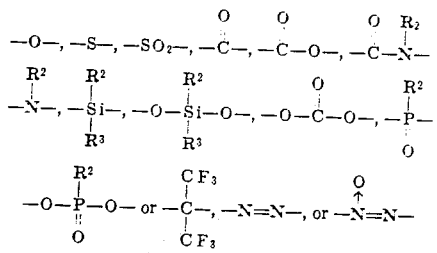

and $R^5$ is an alkyl radical of one to three carbon atoms and $R^7$ and $R^8$ are individually selected from the group consisting of an alkyl radical having one to three carbon atoms and an aryl radical.

2. The polymer of claim 1 wherein

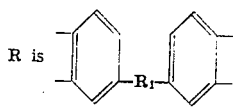

$R_1$ is selected from the group consisting of $-SO_2-$,

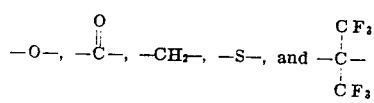

$R_4$ is selected from the group consisting of

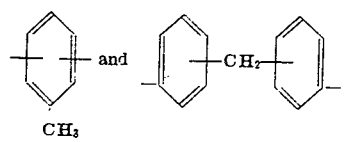

3. The polymer of claim 1 wherein R is selected from the group consisting of

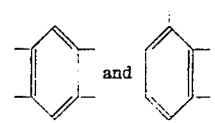

4. The polymer of claim 1 wherein R is selected from the group consisting of

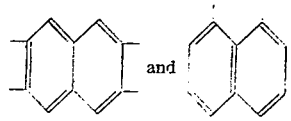

5. The polymer of claim 1 wherein R is

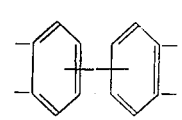

where R is selected from the group consisting of

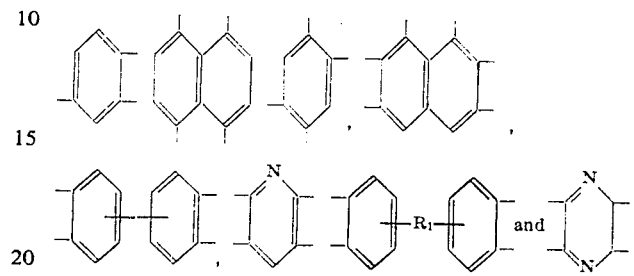

wherein $R^1$ is selected from the group consisting of an alkylene radical containing one to four carbon atoms,

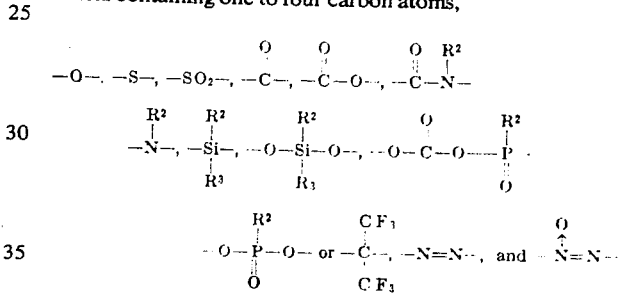

wherein $R^2$ and $R_3$ are individually selected from the group consisting of an alkyl radical having one to three carbon atoms and an aryl radical, and wherein $R^4$ is selected from the group consisting of an alkylene radical having two to 40 carbon atoms,

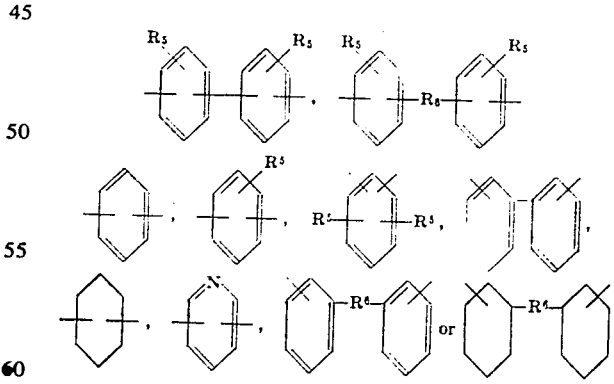

wherein $R^6$ is either an alkylene radical containing one to four carbon atoms,

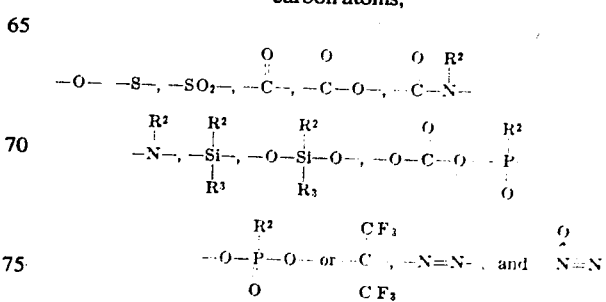

and $R^5$ is an alkyl radical of one to three carbon atoms and $R^7$ and $R^8$ are individually selected from the group consisting of an alkyl radical having one to three carbon atoms and an aryl radical.

6. A composition thermally convertible to an infusible polymer comprising at least one isocyanate and at least one o-aminonitrile, said isocyanate having the formula $$R^4 - (NCO)_n$$

where $n$ is an integer greater than 1 and
where $R^4$ is selected from the group consisting of an alkylene radical having 2-40 carbon atoms,

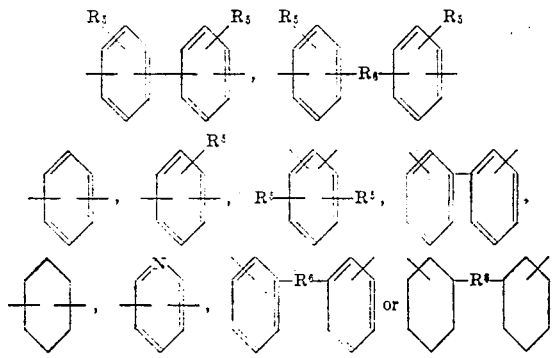

wherein $R^6$ is either an alkylene radical containing 1-4 carbon atoms,

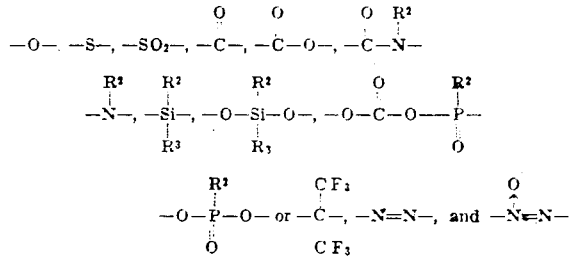

and $R^5$ is an alkyl radical of one to three carbon atoms and $R^7$ and $R^8$ are individually selected from the group consisting of an alkyl radical having one to three carbon atoms and an aryl radical; said o-aminonitrile having the formula $$(NC)_n - R - (NH_2)_n$$

where each CN is ortho to an $NH_2$ group, where R is selected from the group consisting of

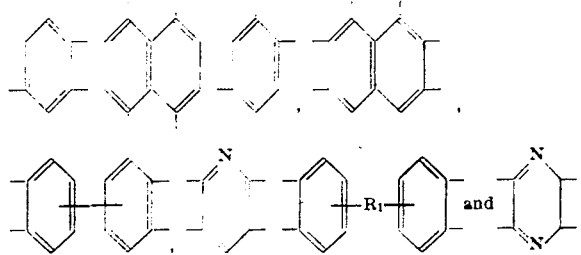

wherein $R^1$ can be an alkylene radical containing 1-4 carbon atoms,

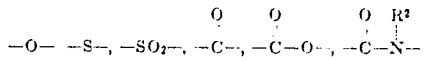
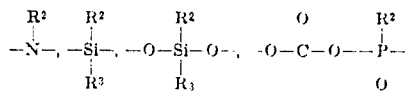
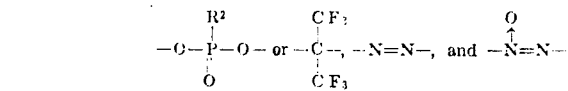

where $R^2$ and $R^3$ are individually selected from the group consisting of an alkyl radical having 1-3 carbon atoms and an aryl radical, and
where $n$ is any integer greater than 1.

7. The precursor composition of claim 6 wherein the isocyanate forms about 40 to 60 mol percent of the said composition and wherein the o-amino-nitrile forms from about 40 to 60 mol percent of said composition.

8. A precursor thermally convertible to an infusible polymer consisting essentially of the structure described by the formula

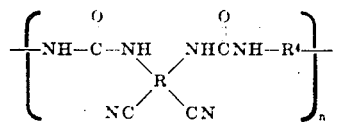

where $n$ is an integer sufficient to give the polymer a molecular weight (number average) of greater than 2,000, and 9. The composition of claim 6 wherein there is also present the compound consisting essentially of the structure described by the formula

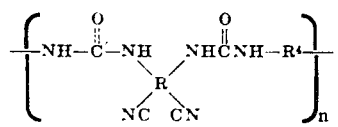

where $n$ is an integer sufficient to give the polymer a molecular weight (number average) of greater than 2,000, and
where R is selected from the group consisting of

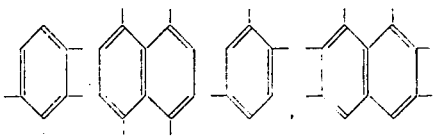

wherein $R^1$ is selected from the group consisting of an alkylene radical containing one to four carbon atoms,

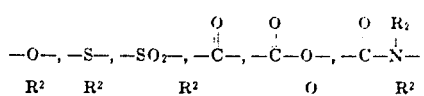
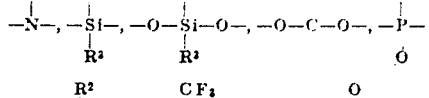
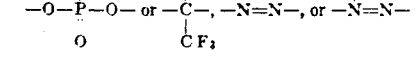

wherein $R^2$ and $R_3$ are individually selected from the group consisting of an alkyl radical having one to three carbon atoms and an aryl radical, and wherein $R^4$ is selected from the group consisting of an alkylene radical having two to 40 carbon atoms,

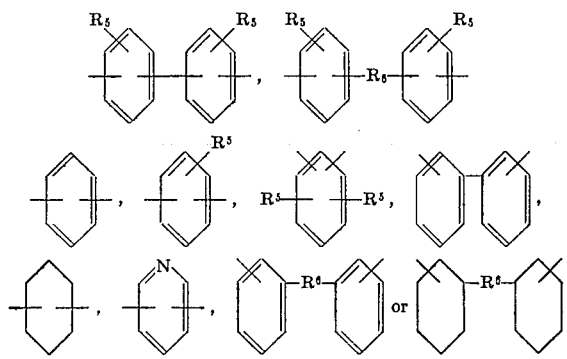

wherein $R^6$ is either an alkylene radical containing 1-4 carbon atoms,

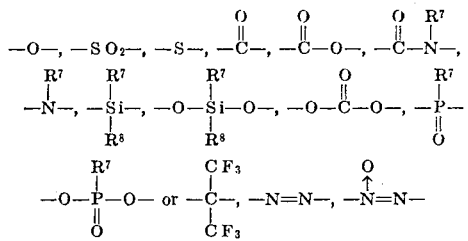

and $R^5$ is an alkyl radical of one to three carbon atoms and $R^7$ and $R^8$ are individually selected from the group consisting of an alkyl radical having one to three carbon atoms and an aryl radical.

* * * * *

PO-1050
(5/69)

UNITED STATES PATENT OFFICE
CERTIFICATE OF CORRECTION

Patent No. 3,674,749        Dated July 4, 1972

Inventor(s)     James M. Craven

It is certified that error appears in the above-identified patent and that said Letters Patent are hereby corrected as shown below:

In claim 1, column 6, lines 60-70, "$R^7$" (each occurrence) should read --$R^2$-- and "$R^8$" (each occurrence) should read --$R^3$--.

In claim 1, column 7, lines 20-30, and in claim 6, column 9, lines 35-49, "$R^2$" (each occurrence) should read --$R^7$-- and "$R^3$" (each occurrence) should read --$R^8$--.

Signed and sealed this 8th day of May 1973.

(SEAL)
Attest:

EDWARD M. FLETCHER, JR.        ROBERT GOTTSCHALK
Attesting Officer               Commissioner of Patents